May 29, 1928.
N. R. LOVE
1,671,535
SEAM WELDED RAILWAY JOINT
Filed June 8, 1926
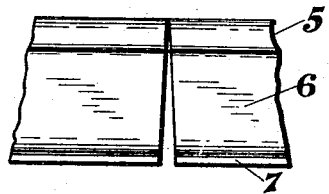
Fig.1
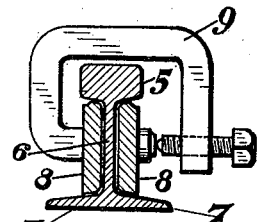
Fig.3
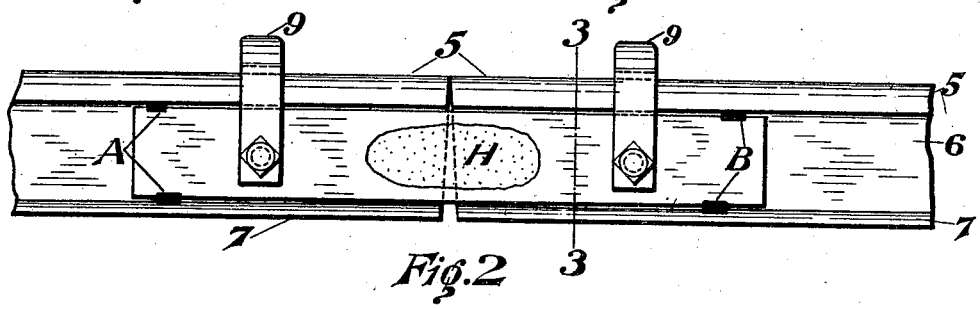
Fig.2
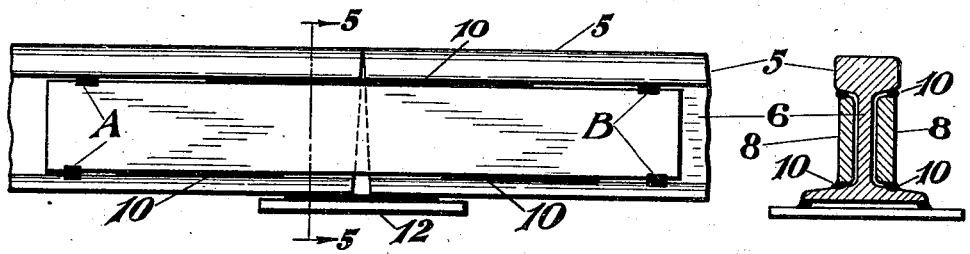
Fig.4
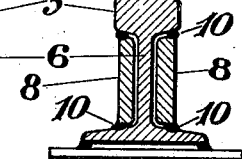
Fig.5
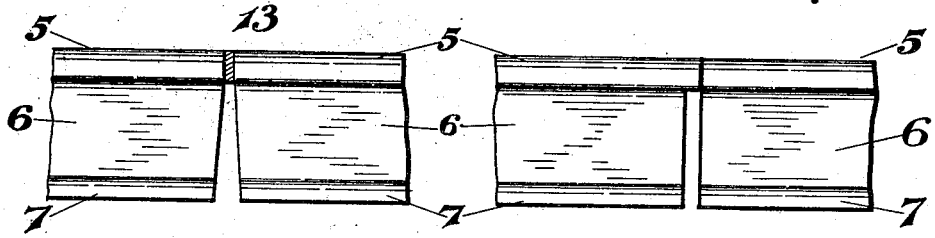
Fig.6
Fig.7
INVENTOR.
Nelson R. Love.
BY
ATTORNEY.

Patented May 29, 1928.

1,671,535

UNITED STATES PATENT OFFICE.

NELSON R. LOVE, OF DENVER, COLORADO.

SEAM-WELDED RAILWAY JOINT.

Application filed June 8, 1926. Serial No. 114,454.

My invention relates to a method of making rail-joints and its principal object is to provide a highly effective though simple method of joining two end-to-end abutting parts such as railway rails, under artificially induced compression strains tending to permanently close the joint between them. Another object is to produce a fish joint of the above character without the use of bolts or rivets demanding the formation of weakening holes in the parts to be joined and in the members employed to bridge the joint between the parts. A further object of the invention is to produce the permanently closed joint between the parts, as hereinabove set forth, by the thermic expansion and contraction of a bridging or binding member, and still another object is to produce a permanent connection between the parts and the member or members bridging the joint thereof, by welding or brazing only.

My invention consists briefly in heating a bridging member for its longitudinal expansion, and fastening the member to the two abutting parts and across the joint between them, before it cools. The subsequent contraction of the bridging member causes the abutting parts to be strongly pressed against each other by mutual compression with the result that the joint remains closed permanently.

In producing a joint between rails-sections, the bridging or binding members applied at opposite sides thereof, are of the kind commonly known as fish plates, and it is a distinctive feature of the invention that the binding members may be heated and then fastened to both parts at opposite sides of the joint, or that they may be first connected to one part and heated in place after which it is also fastened to the other part. The last described method is preferred by reason of its simplicity and ease of operation.

In the accompanying drawings, I have illustrated a joint between two railway rails, produced by my improved method. The invention is obviously of particular value in railway construction but it is to be understood that it is not limited to this use but can be employed in any structure requiring a permanently tight joint between adjoining parts. In the drawings in the views of which like parts are similarly designated, Figure 1 represents an elevation of the end-portion of two abutting railway rails, the ends of which are beveled, to insure the contact of their heads, Figure 2, a side elevation of similar rails, illustrating a step in my improved method of joining them together through the medium of fish plates as binding members, Figure 3, a section taken on the line 3—3 Figure 2; Figure 4 an elevation of the parts shown in Figure 2, after the joint produced by the present method, is complete; Figure 5 a section along the line 5—5 Figure 4, and Figures 6 and 7, elevations of the end-portions of the abutting rails, showing other methods to obtain a permanently tight joint between the heads of the same.

The rails to be joined by the method of my invention, are beveled at their ends as shown in Figure 1, or undercut as indicated in Figure 6 so that when placed in alinement, their heads only will be in contact when the rails are pressed together, thereby insuring a permanently tight joint at the treads of the rails.

Fish plates 8 fitted between the heads 5 and the flanges 7 of the alined rail-sections, alongside of the webs 6 of the same, are secured in place by means of C-clamps 9. The fish plates are now fastened adjacent one of their ends to one of the rail sections by spot welding as indicated at B in Figures 2 and 4, preferably through the medium of a voltaic arc.

After the fish plates are clamped in place on the rail sections, and if so desired after they have been welded at one of their ends as stated hereinbefore, the two rails are forcibly driven together for the purpose of reducing the gap between their contacting heads to the minimum. The same result may be produced by driving a thin piece of metal corresponding in form with the heads of the rails, between the heads as indicated at 13 in Figure 6.

Following this, the fish plates are heated in a central region indicated at H in Figure 2 which is readily accomplished by means of an electric arc.

The heat will cause considerable local longitudinal expansion of the metal of which the fish plates are composed, and while the plates are in their expanded condition and before the heat has been communicated to the rails, the free ends of the plates are fastened to the corresponding rail section by spot welding as shown at A in Figure 2.

After this is done the clamps may be removed and the subsequent contraction of the fish plates by cooling of their metal will induce a mutual compression of the rails at the point at which their heads engage, resulting in a joint at the treads of the rails which will remain closed permanently.

The joint is completed and strengthened by seam-welding along the edges of the fish plates as shown at 10 in the drawings, and the joint may be further reenforced through the medium of a base plate 12 beneath the flanges of the rails, which is brazed in place by electric welding.

It will be apparent that the joint thus produced, insures a permanently tight contact at the treads of the rails by constant mutual compression; that it eliminates the provision of bolt holes in the rails and the fish plates which tend to weaken the structure; that the joint is easily made by means of a torch commonly employed in electric welding, and that while being strong and durable, the plates are easily removed and replaced for repair or adjustment of the track.

Having thus described my invention what I claim and desire to secure by Letters Patent is:—

1. The method of joining abutting parts by the use of a bridging member, consisting in first attaching the member to one of the parts, then heating the member for its expansion, and attaching the member in its expanded condition to the other part.

2. The method of joining abutting parts by the use of a bridging member, consisting in attaching the member to one of the parts, heating the member for its expansion, attaching the member in its expanded condition to the other part, and completing the connection by additional fastening means after cooling of the member.

3. The method of joining abutting parts by the use of a bridging member, consisting in welding the member to one of the parts, heating the member for its expansion, and welding the member in its expanded condition to the other part.

4. The method of joining abutting parts by the use of a bridging member, consisting in welding the member to one of the parts, heating the member for its expansion, welding the member in its expanded condition to the other part, and completing the joint by additional welding.

5. The method of joining abutting parts by the use of a bridging member, consisting in clamping the member to the parts, then welding the member to one of the parts, heating the member for its expansion, and welding the member in its expanded condition to the other part.

6. The method of joining abutting parts by the use of a bridging member, consisting in clamping the member to the parts, forcibly closing the joint between the parts, welding the member to one of the parts, heating the member for its expansion, and welding the member in its expanded condition to the other part.

7. A railway joint comprising two alined rail sections abutting at their heads exclusive of their lower portions, and a fish bar connecting the rail sections and subjecting the heads to mutual compression.

8. A railway joint comprising two alined rail sections abutting at their heads exclusive of their lower portions, and a fish bar welded to the rail sections and subjecting the heads to mutual compression.

9. A railway joint comprising two alined rail sections mutually compressing each other at their ends, and a fish plate fastened to the sections and holding the sections under said compression.

10. The method of joining adjacent rail ends consisting in attaching a fish plate to one of the rails, heating the plate in a localized area, and attaching the plate while in a heated condition to the other rail.

In testimony whereof I have affixed my signature.

NELSON R. LOVE.